UNITED STATES PATENT OFFICE.

HUGO FLECK, OF DRESDEN, SAXONY, ASSIGNOR TO WILLIAM A. FLECK, OF PHILADELPHIA, PENNSYLVANIA.

IMPROVEMENT IN THE MANUFACTURE OF GLUE.

Specification forming part of Letters Patent No. 90,160, dated May 18, 1869; Reissue No. 3,677, dated October 19, 1869.

*To all whom it may concern:*

Be it known that I, Dr. HUGO FLECK, professor of chemistry at the Polytechnical School of Dresden, in the Kingdom of Saxony, have invented a new and useful Improvement in the Manufacture of Glue; and I do hereby declare that the following is a full and exact description thereof.

The nature of my invention consists in an improved process of solidifying and drying the gelatinous menstruum, obtained in the usual manner, from any of the known materials, such as clippings of hides, hoofs, &c.; and whereas the application of my improvement requires no modification of the ordinary machinery used in the manufacture, it can be fully and clearly described without the use drawings.

In the manufacture of glue, as heretofore practiced, the stiffened gelatinous solution, containing about eighty (80) per centum of water, is cut into slices, and these are exposed to the air for drying. This process of drying, is, however, the precarious stage in the manufacture of glue, as any disturbance of the weather may injure the product, especially during the first few days.

My invention will obviate these difficulties, and not only avoid thereby the present risk in manufacturing, but also diminish the time and the number of handlings required in the process as now conducted.

My improved process is as follows: After obtaining the gelatine in any ordinary manner from the usual materials, and having evaporated and cooled it to a due consistency, I cut it, as usual, into slices. These slices I submerge in a solution of one part of salt in eight parts of water. After a lapse of about ten or twelve hours the slices assume a somewhat hardened and tough consistency. I now add two (2) parts more of dry salt to the menstruum, and allow the slices to remain in the same for ten or twelve hours longer. They will then be found so much hardened on the surface as to permit taking them out and wip them off, to remove the salt adhering to the surface. The slices may now be rapidly dried by subjecting them, in any appropriate place, to a temperature of from 40° to 120° Fahrenheit. The salt can be easily recovered by evaporation and used again.

My above process of quick drying may be modified and made even more expeditious by placing the jelly into a solution of one (1) part of salt to three (3) parts of boiling water. This hot solution will deprive the jelly at once of its water, so that it can be taken out almost immediately, washed off to remove the salt, and dried as above. This last method of quick drying in the hot saline solution imparts, however, to the glue an opaque whitish appearance, and is therefore only advantageous where this appearance of the glue does not lessen its commercial value on account of the absence of the customary transparent clearness of the better qualities of glue.

Another modification of my process of quick drying consists in extracting a large amount of water from the gelatine by placing the slices upon or into a layer of dry salt, which should be finely broken or ground.

The salt solutions or dry salt used in my improved process are weakened in direct proportion to the quantity of water extracted from the gelatine, and may be concentrated or entirely evaporated in suitable vessels, and then used again.

Having thus described the nature of my invention, I do not intend to limit its practical application to the exact described proportions of salt in the drying solutions, nor do I confine myself to the use of any particular kind of salt in the process, since various alkaline or metallic salts are applicable for the purpose; but

What I claim as my invention, and desire to secure by Letters Patent, is—

The herein-described use of salts, either dry or in solution, in the process of drying glue.

HUGO FLECK,
Per WILLIAM A. FLECK,
*Sole Owner of Patent.*

Witnesses:
N. C. BURNHAM,
A. BIMMER.